(12) United States Patent
Tsai et al.

(10) Patent No.: US 8,937,649 B2
(45) Date of Patent: Jan. 20, 2015

(54) METHOD OF DISPLAYING A THREE-DIMENSIONAL IMAGE

(75) Inventors: Meng-Chieh Tsai, Hsin-Chu (TW);
Chih-Wen Chen, Hsin-Chu (TW);
Chih-Hung Shih, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 372 days.

(21) Appl. No.: 13/315,257

(22) Filed: Dec. 8, 2011

(65) Prior Publication Data

US 2012/0162209 A1    Jun. 28, 2012

(30) Foreign Application Priority Data

Dec. 27, 2010  (TW) .............................. 99146066 A

(51) Int. Cl.
*H04N 13/04* (2006.01)
*G02B 27/22* (2006.01)
*H04N 13/00* (2006.01)

(52) U.S. Cl.
CPC ........ *G02B 27/2228* (2013.01); *H04N 13/0007* (2013.01)
USPC .......................................................... 348/51

(58) Field of Classification Search
None
See application file for complete search history.

(56) References Cited

U.S. PATENT DOCUMENTS

| 6,532,008 | B1 | 3/2003 | Guralnick | |
| 2006/0268104 | A1* | 11/2006 | Cowan et al. | 348/42 |
| 2011/0316974 | A1* | 12/2011 | Kao et al. | 348/46 |
| 2012/0062709 | A1* | 3/2012 | Kerofsky et al. | 348/51 |

FOREIGN PATENT DOCUMENTS

CN    101895778 A    11/2010

* cited by examiner

*Primary Examiner* — Thai Tran
*Assistant Examiner* — Stephen Smith
(74) *Attorney, Agent, or Firm* — Winston Hsu; Scott Margo

(57) ABSTRACT

A method of displaying a three-dimensional image is disclosed. The method includes the steps of receiving a left-eye gray level image array and a right-eye gray level image array; converting the left-eye gray level image array and the right-eye gray level image array into a left-eye luminance image array and a right-eye luminance image array respectively; receiving a left-eye compensation array; adjusting the right-eye luminance image array in accordance with the left-eye luminance array and the left-eye compensation array; converting the adjusted right-eye luminance image array into an adjusted right-eye gray level image array; displaying the adjusted right-eye gray level image array.

8 Claims, 6 Drawing Sheets

METHOD OF DISPLAYING A THREE-DIMENSIONAL IMAGE

BACKGROUND OF THE INVENTION

1. Field of the Invention

The present invention is related to a method of displaying a three-dimensional image, and more particularly, to a method of displaying a three-dimensional image which eliminates ghost images.

2. Description of the Prior Art

Please refer to FIG. 1. FIG. 1 is a diagram illustrating a three-dimensional (3D) image display device composed by a conventional flat panel display device and a micro-optical element. As shown in FIG. 1, the three-dimensional image display device is generally composed by a conventional flat panel display device and a micro-optical element (e.g. a parallax barrier or lenticular lens, etc.). The flat panel display device displays images corresponding to each individual perspective on corresponding pixels, or displays images corresponding to each individual perspective at different time intervals. The purpose of the micro-optical element is to project images corresponding to each individual perspective to corresponding horizons in space.

Please refer to FIG. 2. FIG. 2 is a diagram illustrating each eye of a user perceiving an extra dot due to leakage from images of the other eye. As shown in FIG. 2, during image processing of the conventional three-dimensional image display device, the left and right eye input images are obtained from a video input end. Images corresponding to a perspective of the left eye are displayed in even lines of the three-dimensional image display device, and images corresponding to a perspective of the right eye are displayed in odd lines of the three-dimensional image display device. The left and right eyes of the user, which are positioned at appropriate perspectives, observe images corresponding to perspectives of the left and right eye, and then the brain fuses the observed images together for the user to perceive three-dimensional images.

The efficiency of the micro-optical element splitting light beams may not be 100% due to design and technical limitations, as well as possible variations occurring during processing. Therefore, in reality, human eyes also observe images corresponding to other vision perspectives in certain perspectives. As shown in FIG. 2, each of the left and right eyes should only see one white dot, theoretically, but due to leakage from images of the other eye, an extra grey dot is perceived by both eyes of the user. Such phenomenon is known as a ghost image or crosstalk. The ghost image or crosstalk phenomenon degrades quality of the three-dimensional images, delivering an uncomfortable viewing experience to the user, or even resulting in sensations of dizziness or headache, etc.

SUMMARY OF THE INVENTION

The present invention discloses a method for displaying a three-dimensional image. The method comprises receiving a left-eye gray level image array and a right-eye gray level image array; converting the left-eye gray level image array and the right-eye gray level image array into a left-eye luminance image array and a right-eye luminance image array respectively; receiving a compensation array; adjusting the right-eye luminance image array according to the left-eye luminance image array and the compensation array; converting the adjusted right-eye luminance image array into an adjusted right-eye gray level image array; and displaying the adjusted right-eye gray level image array on a display platform.

The present invention further discloses a method for displaying a three-dimensional image. The method comprises receiving a left-eye gray level image array and a right-eye gray level image array; converting the left-eye gray level image array and the right-eye gray level image array into a left-eye luminance image array and a right-eye luminance image array respectively; receiving a compensation array; adjusting the right-eye luminance image array according to the left-eye luminance image array, the right-eye luminance image array and the compensation array; converting the adjusted right-eye luminance image array into an adjusted right-eye gray level image array; and displaying the adjusted right-eye gray level image array on a display platform.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
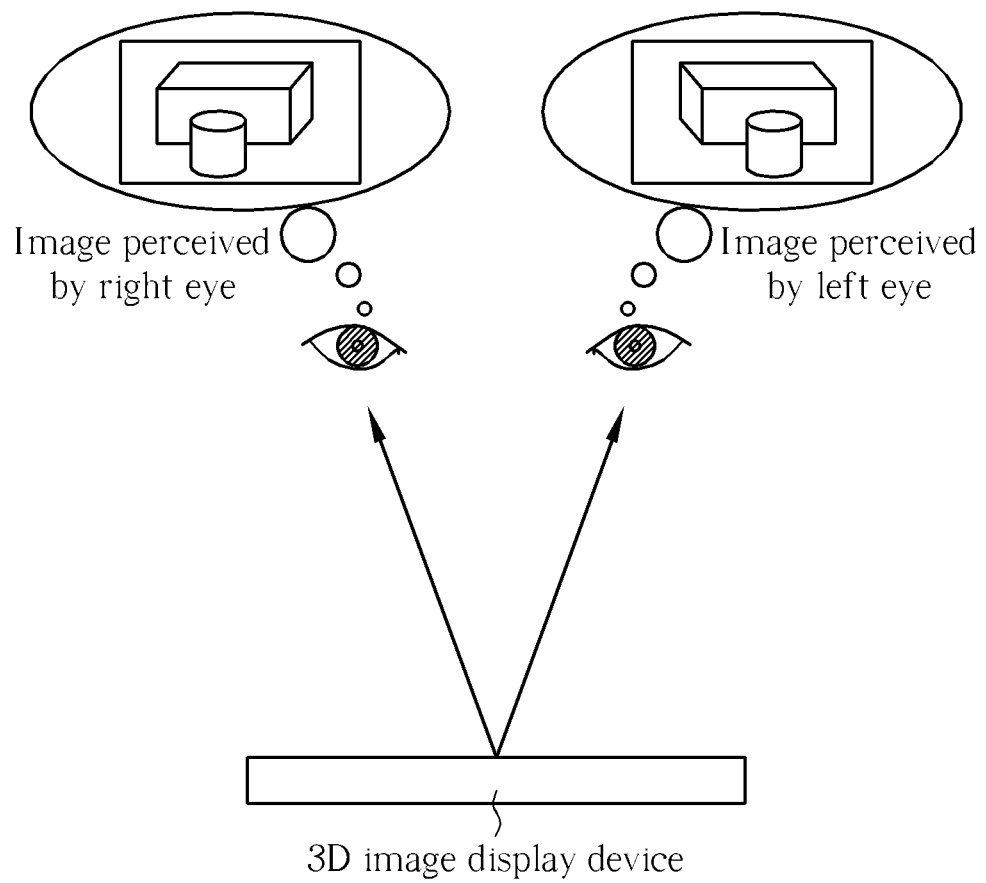
FIG. 1 is a diagram illustrating a three-dimensional image display device composed by a conventional flat panel display device and a micro-optical element.
Figure 2:
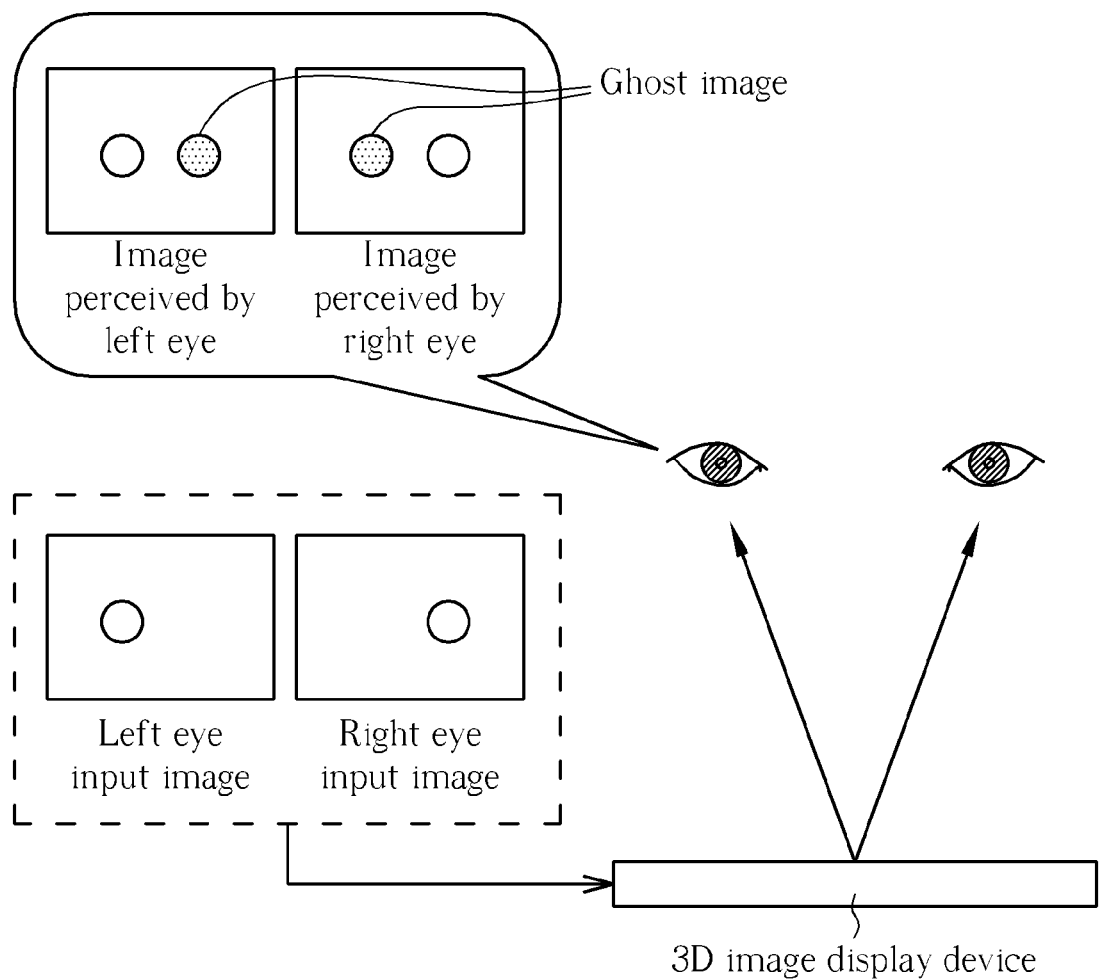
FIG. 2 is a diagram illustrating each eye of a user perceiving an extra dot due to leakage from images of the other eye.
Figure 3:
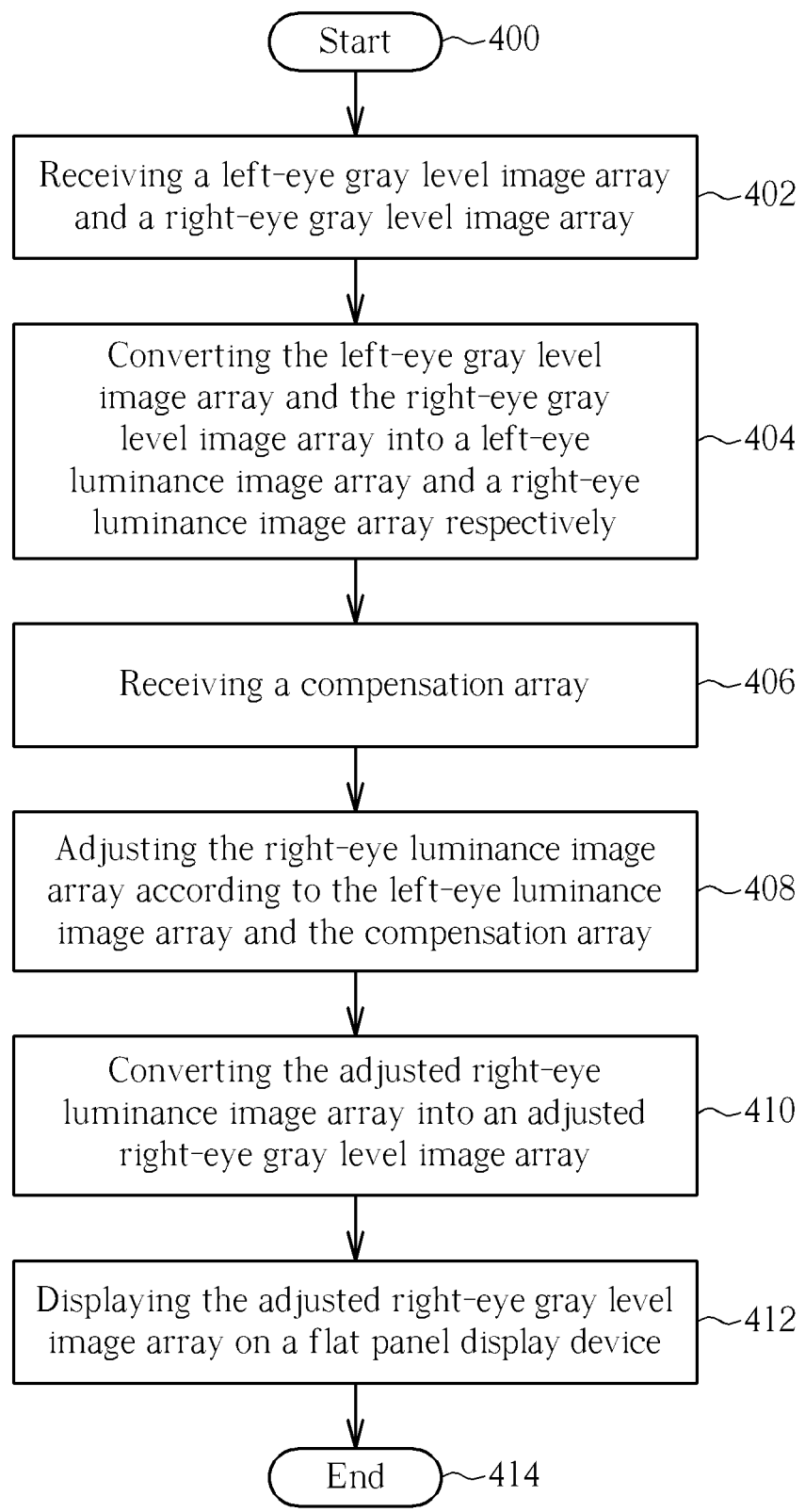
FIG. 3 is a flow chart illustrating a method of displaying a three-dimensional image according to an embodiment of the present invention.

Please refer to FIG. 3. FIG. 3 is a flow chart illustrating a method of displaying a three-dimensional (3D) image according to an embodiment of the present invention. Steps of the method are detailed as below:

Step 402: receiving a left-eye gray level image array and a right-eye gray level image array;

Step 404: converting the left-eye gray level image array and the right-eye gray level image array into a left-eye luminance image array and a right-eye luminance image array respectively;

Step 406: receiving a compensation array;

Step 408: adjusting the right-eye luminance image array according to the left-eye luminance image array and the compensation array;

Step 410: converting the adjusted right-eye luminance image array into an adjusted right-eye gray level image array; and Step 412: displaying the adjusted right-eye gray level image array on a flat panel display device.

In step 404, the right-eye gray level image array is converted to the right-eye luminance image array according to formula (1a), and the left-eye gray level image array is converted to the left-eye luminance image array according to formula (1b). Formula (1a) is utilized to describe an element in an nth row and mth column of the right-eye gray level image array. Formula (1b) is utilized to describe an element in an nth row and mth column of the left-eye gray level image array.

$$IR_{nm}=(BR_{nm}/255)^\gamma \tag{1a}$$

$$IL_{nm}=(BL_{nm}/255)^\gamma \tag{1b}$$

wherein $BR_{nm}$ represents the element in the nth row and mth column of the right-eye gray level image array, $IR_{nm}$ represents the element in the nth row and mth column of the right-eye luminance image array, $BL_{nm}$ represents the element in the nth row and mth column of the left-eye gray level image array, $IL_{nm}$ represents the element in the nth row and mth column of the left-eye luminance image array, and value of γ is generally "2.3". Formulae (1a) and (1b) are merely exemplary embodiments; the conversion method of step 404 of the present invention is not limited to formulae (1a) and (1b). Taking an 8-bit image as an example, the gray levels of $BL_{nm}$ and $BR_{nm}$ are in a range of gray levels 1-255.

In step 408, the left-eye luminance image array and the compensation array are substituted into formula (2) for adjusting each right-eye element in the right-eye luminance image array, so as to eliminate ghost images in the right-eye luminance image array caused by the left-eye luminance image array. Referring back to FIG. 3, for the element in the nth row and mth column of the right-eye luminance image array, the ghost image caused by the left-eye luminance image array exists in the nth row and mth column of the right-eye luminance image array, so the element in the nth row and mth column of the right-eye luminance image array is subtracted by $C_{nm} \times IL_{nm}$.

$$IR_{nm}'=IR_{nm}-C_{nm} \times IL_{nm} \tag{2}$$

where $IR_{nm}'$ represents the element in the nth row and mth column of the adjusted right-eye luminance image array, $IL_{nm}$ represents the element in the nth row and mth column of the left-eye luminance image array, and $C_{nm}$ represents the element in the nth row and mth column of the compensation array. Furthermore, elements of the compensation array can be all identical, or partially identical, or set to be different from each other according to characteristics of the flat panel display device.

After eliminating ghost images in the right-eye luminance image array, step 410 can then be performed. The adjusted right-eye luminance image array is converted into an adjusted right-eye gray level image array according to formula (3):

$$BR_{nm}'=(IR_{nm}')^{(1/\gamma)} \times 255 \tag{3}$$

According to the method illustrated in FIG. 3, ghost images in the right-eye luminance image array can be eliminated by utilizing the compensation array. The method of utilizing the compensation array to eliminate ghost images in the left-eye luminance image array is similar to the method of utilizing the compensation array to eliminate ghost images in the right-eye luminance image array, so the detailed description thereof is omitted hereinafter.

Figure 4:
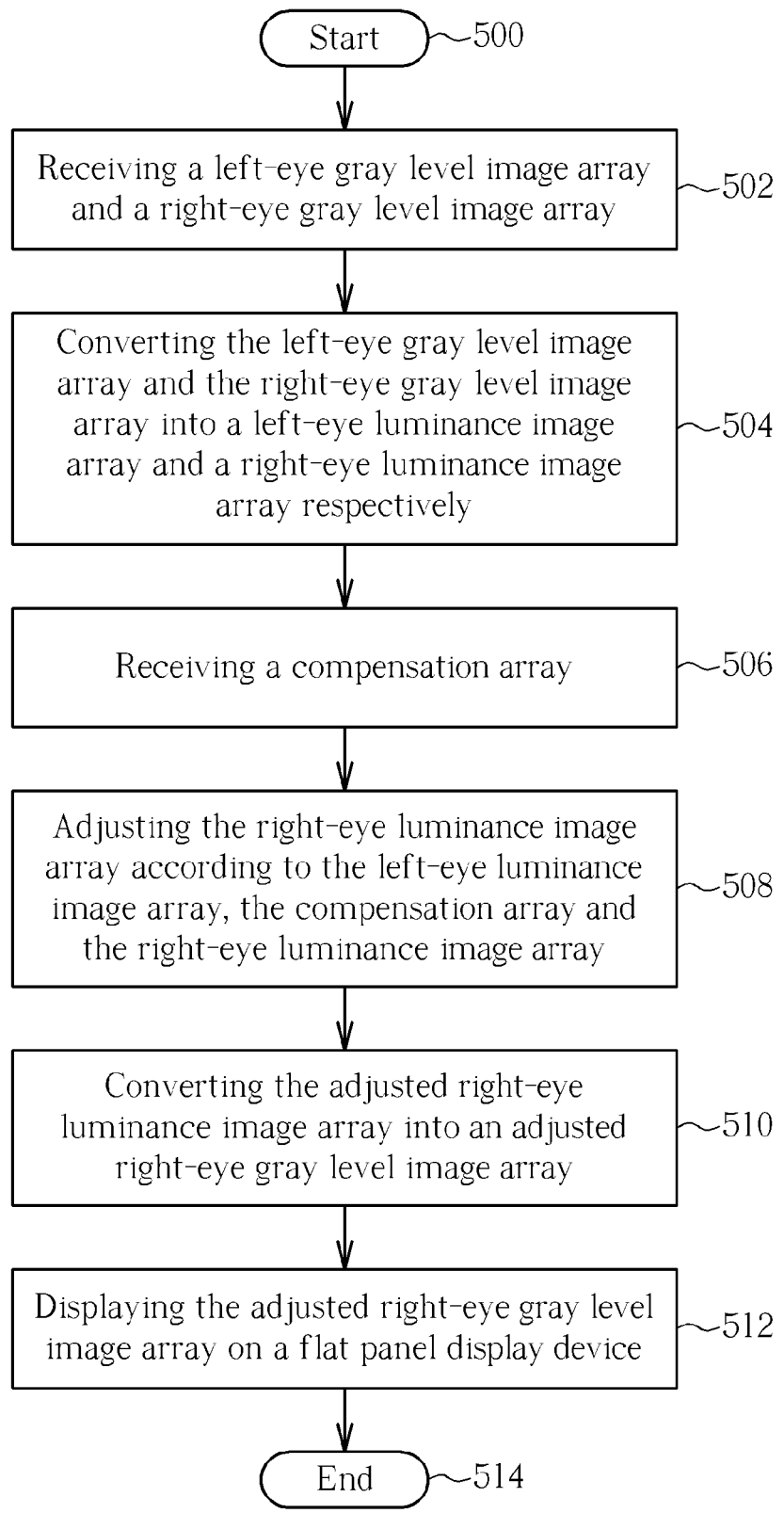
FIG. 4 is a flow chart illustrating a method of displaying a three-dimensional image according to another embodiment of the present invention.

Please refer to FIG. 4. FIG. 4 is a flow chart illustrating a method of displaying a three-dimensional image according to another embodiment of the present invention. Steps of the method are detailed as below:

Step 502: receiving a left-eye gray level image array and a right-eye gray level image array;

Step 504: converting the left-eye gray level image array and the right-eye gray level image array into a left-eye luminance image array and a right-eye luminance image array respectively;

Step 506: receiving a compensation array;

Step 508: adjusting the right-eye luminance image array according to the left-eye luminance image array, the compensation array and the right-eye luminance image array;

Step 510: converting the adjusted right-eye luminance image array into an adjusted right-eye gray level image array; and Step 512: displaying the adjusted right-eye gray level image array on a flat panel display device.

Figure 5:
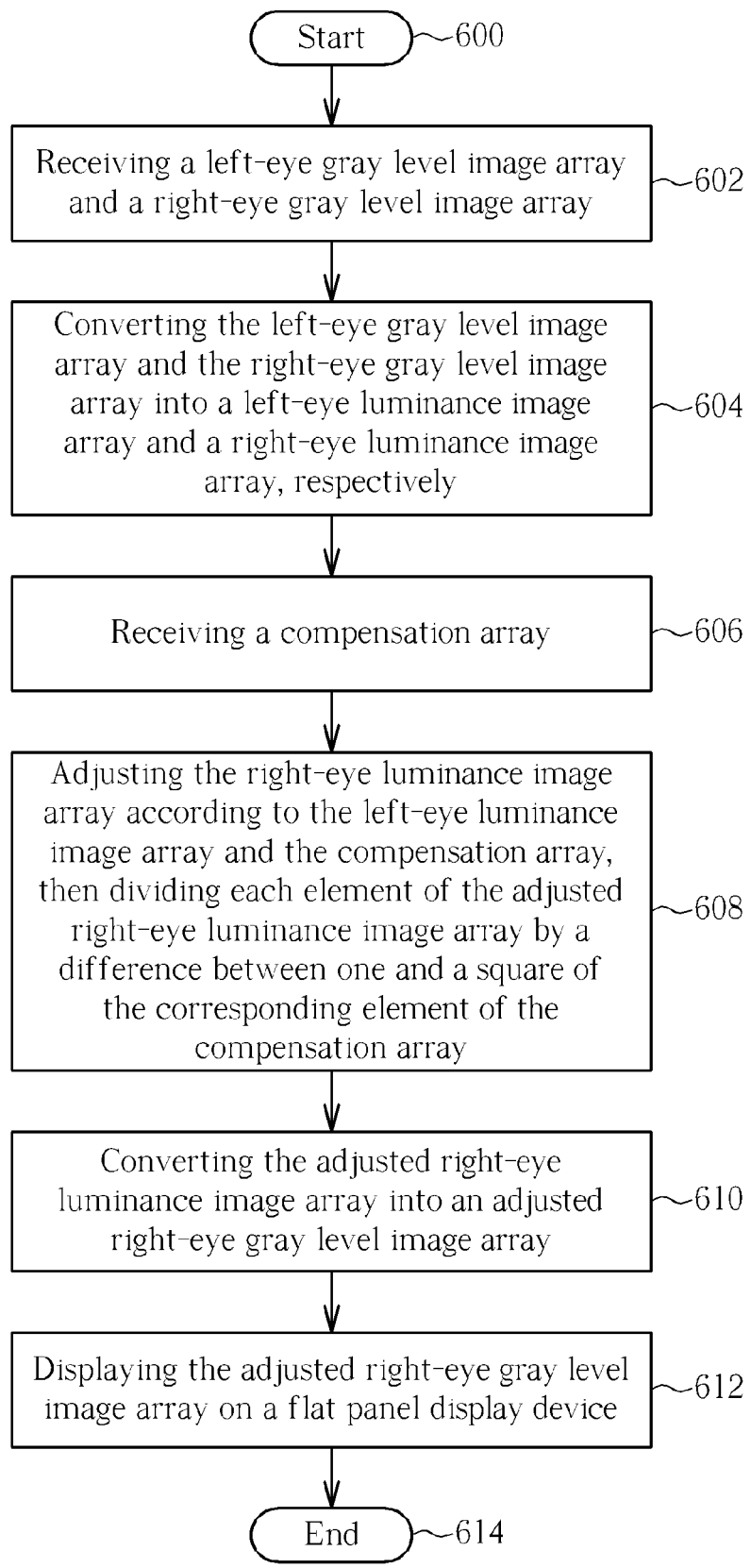
FIG. 5 is a flow chart illustrating a method of displaying a three-dimensional image according to another embodiment of the present invention.

The difference between embodiments illustrated in FIG. 4 and FIG. 5 is step 508. In step 508, the left-eye luminance image array, the compensation array and the right-eye luminance image array are substituted into formula (4), for adjusting the right-eye luminance image array.

$$IR_{nm}'=IR_{nm}-C_{nm} \times IL_{nm}+C_{nm} \times IR_{nm} \tag{4}$$

In other words, in step 508, in addition to eliminating ghost images in the nth row and mth column, the reduced luminance due to eliminating ghost images in the nth row and mth column can also be compensated for preventing overall luminance of the right-eye luminance image array from decreasing due to executing formula (4).

Apart from formula (4), step 508 can also be realized with formula (5), meaning formula (4) can be replaced by formula (5) in this case. By utilizing formula (5), a crosstalk phenomenon caused by formula (2) can be further reduced.

$$IR_{nm}'=IR_{nm}-C_{nm} \times IL_{nm}+C_{nm}^2 IR_{nm} \tag{5}$$

Please refer to FIG. 5. FIG. 5 is a flow chart illustrating a method of displaying a three-dimensional image according to another embodiment of the present invention. Steps of the method are detailed as below:

Step 602: receiving a left-eye gray level image array and a right-eye gray level image array;

Step 604: converting the left-eye gray level image array and the right-eye gray level image array into a left-eye luminance image array and a right-eye luminance image array, respectively;

Step 606: receiving a compensation array;

Step 608: adjusting the right-eye luminance image array according to the left-eye luminance image array and the compensation array, then dividing each element of the adjusted right-eye luminance image array by a difference between one and a square of the corresponding element of the compensation array;

Step 610: converting the adjusted right-eye luminance image array from step 608 into an adjusted right-eye gray level image array; and Step 612: displaying the adjusted right-eye gray level image array on a flat panel display device.

The embodiment illustrated in FIG. 5 is derived from the embodiment of FIG. 4. In the embodiment of FIG. 4, crosstalk is generated again by a compensated component for compensating the leakage from perspectives of left and right eyes, and continued recursing compensation results in an infinite geometric series. In step 608, left-eye luminance image array, compensation array and right-eye luminance image array are substituted into formula (6) for adjusting the right-eye luminance image array.

$$IR_{nm}' = \frac{IR_{nm} - C_{nm} \times IL_{nm}}{1 - C_{nm}^2} \tag{6}$$

Embodiments illustrated in FIG. 3, FIG. 4 and FIG. 5 mentioned above utilize the left-eye luminance image array and the compensation array to adjust the right-eye luminance image array. However, FIG. 3, FIG. 4 and FIG. 5 are not limited to this, such that the right-eye luminance image array and the compensation array can also be utilized to adjust the left-eye luminance image array in a similar manner. The detailed description is omitted hereinafter.

Figure 6:
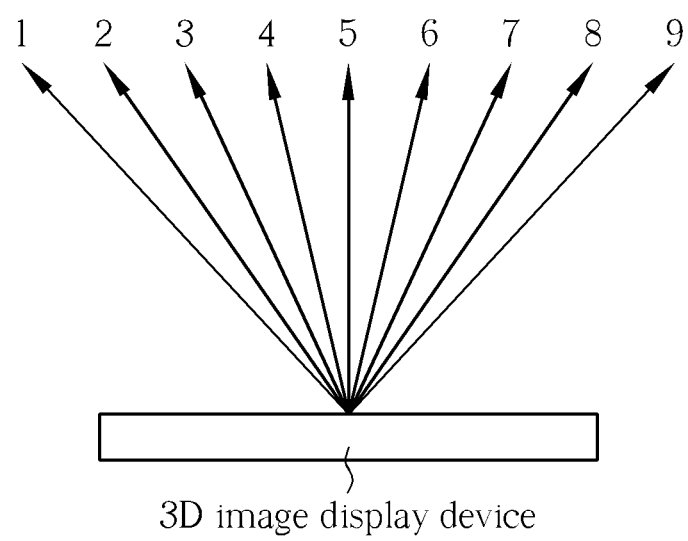
FIG. 6 is a diagram illustrating a multi-view 3D image display device according to an embodiment of the present invention.

Please refer to FIG. 6. FIG. 6 is a diagram illustrating a multi-view 3D image display device according to an embodiment of the present invention. Due to characteristics of the multi-view 3D image display device, all vision perspectives have to be considered during a compensation process. The compensation process is performed according to formula (7):

$$I'_1 = I_1 - C_{12} \times I_2 - C_{13} \times I_3 \ldots$$
$$I'_2 = I_2 - C_{21} \times I_1 - C_{23} \times I_3 \ldots$$
$$I'_3 = I_3 - C_{31} \times I_1 - C_{32} \times I_2 \ldots$$
$$\vdots$$
(7)

where $C_{12}$ represents the light intensity ratio of leakage leaked from perspective 1 to perspective 2, $C_{13}$ represents the light intensity ratio of leakage leaked from perspective 1 to perspective 3, and so on; $I_1'$ represents the adjusted image luminance of perspective 1, $I_1$ represents the unadjusted image luminance of perspective 1, $I_2'$ represents the adjusted image luminance of perspective 2, $I_2$ represents the unadjusted image luminance of perspective 2, and so on.

In conclusion, the prior art generates ghost images or crosstalk, delivering an uncomfortable viewing experience to the user. For the method of displaying three-dimensional images of the present invention, elements of the compensation array are not limited to being identical to each other. Furthermore, elements of the compensation array of the present invention can be set by the manufacturer when the display panel is manufactured, or adjusted by the user according to practical demands. This way, the present invention can eliminate ghost images effectively, improving quality of the three-dimensional images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for displaying a three-dimensional image, comprising:
    receiving a left-eye gray level image array and a right-eye gray level image array;
    converting the left-eye gray level image array and the right-eye gray level image array into a left-eye luminance image array and a right-eye luminance image array respectively;
    receiving a compensation array;
    adjusting the right-eye luminance image array according to the left-eye luminance image array and the compensation array;
    converting the adjusted right-eye luminance image array into an adjusted right-eye gray level image array;
    adjusting the adjusted right-eye luminance image array according to the right-eye luminance image array and the compensation array; and
    displaying the adjusted right-eye gray level image array on a display platform;
    wherein adjusting the right-eye luminance image array according to the left-eye luminance image array and the compensation array is subtracting each right-eye element of the right-eye luminance image array by a product of a corresponding element of the left-eye luminance image array and a corresponding element of the compensation array, for generating the adjusted right-eye luminance image array;
    wherein adjusting the adjusted right-eye luminance image array according to the right-eye luminance image array and the compensation array is adding each right-eye element of the adjusted right-eye luminance image array with a product of the right-eye element and a square of the corresponding element of the compensation array, for adjusting the adjusted right-eye luminance image array.

2. The method of claim 1, further comprising dividing each element of the adjusted right-eye luminance image array by a difference between one and a square of the corresponding element of the compensation array, for adjusting the adjusted right-eye luminance image array.

3. The method of claim 1, wherein converting the left-eye gray level image array and the right-eye gray level image array into the left-eye luminance image array and the right-eye luminance image array respectively is utilizing a gamma value to convert the left-eye gray level image array and the right-eye gray level image array into the left-eye luminance image array and the right-eye luminance image array, respectively.

4. The method of claim 1, wherein converting the adjusted right-eye luminance image array into the adjusted right-eye gray level image array is utilizing a gamma value to convert the adjusted right-eye luminance image array into the adjusted right-eye gray level image array.

5. The method of claim 1, wherein receiving the right-eye gray level image array is after receiving the left-eye gray level image array.

6. The method of claim 1, wherein a plurality of left-eye compensation constants in the compensation array is not all the same.

7. A method for displaying a three-dimensional image, comprising:
    receiving a left-eye gray level image array and a right-eye gray level image array;
    converting the left-eye gray level image array and the right-eye gray level image array into a left-eye luminance image array and a right-eye luminance image array respectively;
    receiving a compensation array;
    adjusting the right-eye luminance image array according to the left-eye luminance image array, the right-eye luminance image array and the compensation array;
    converting the adjusted right-eye luminance image array into an adjusted right-eye gray level image array; and
    displaying the adjusted right-eye gray level image array on a display platform;
    wherein adjusting the right-eye luminance image array according to the left-eye luminance image array, the right-eye luminance image array and the compensation array is subtracting each right-eye element of the right-eye luminance image array by a product of a corresponding element of the left-eye luminance image array and a corresponding element of the compensation array, and adding each right-eye element of the right-eye luminance image array with a product of the right-eye element and a square of the corresponding element of the compensation array, for generating the adjusted right-eye luminance image array.

8. The method of claim 7, wherein receiving the right-eye gray level image array is after receiving the left-eye gray level image array.

* * * * *